Figure 1:
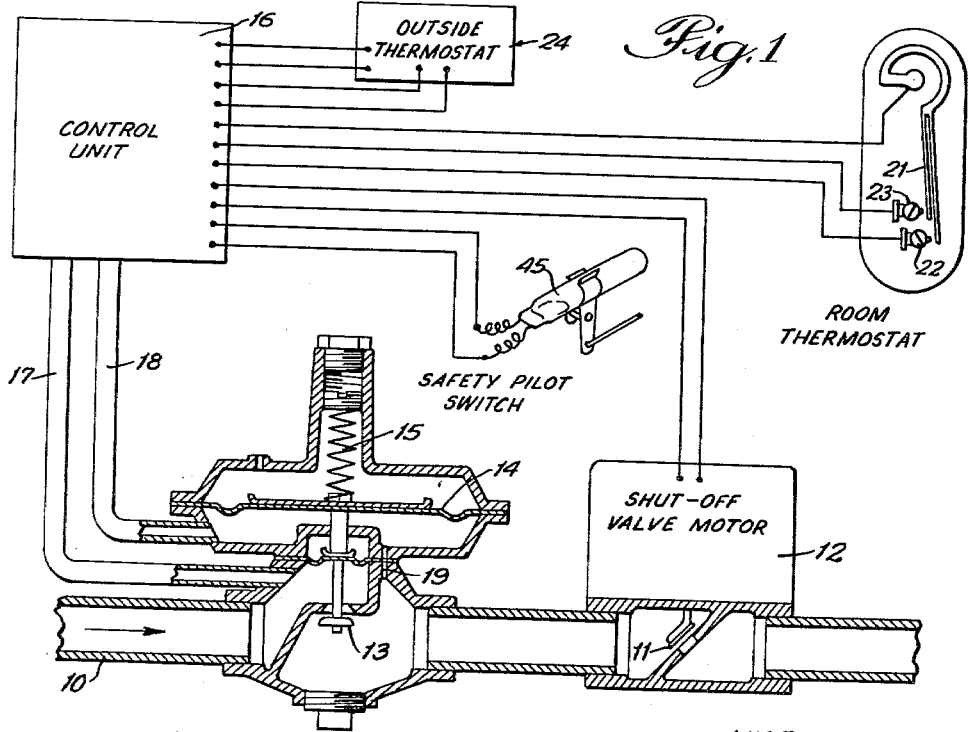

March 2, 1965

F. A. FURLONG ETAL 3,171,596

MODULATING CONTROL SYSTEM FOR SPACE HEATERS

Filed July 31, 1961

INVENTORS:
Francis A. Furlong
and Theodore H. Landgraf,

BY Bair Freeman & Molinare
ATTORNEYS.

United States Patent Office 3,171,596
Patented Mar. 2, 1965

3,171,596
MODULATING CONTROL SYSTEM FOR SPACE HEATERS
Francis A. Furlong, River Forest, and Theodore H. Landgraf, Aurora, Ill., assignors to Autogas Co., Bellwood, Ill., a corporation of Illinois
Filed July 31, 1961, Ser. No. 128,051
4 Claims. (Cl. 236—68)

This invention relates to a temperature control system and more particularly to a system for controlling space heaters, such as fuel fired furnaces, and the like.

The ideal control system for a space heater would be one which caused it to operate at a rate such that it would just compensate for heat losses so that the heater would operate continuously to maintain a constant temperature in the space. Controls of this type are too complicated and expensive to be practical, but various approaches to this ideal have been proposed.

One approach is a modulating type control in which the rate of heat input varies proportionately to the demand, as measured by a thermostat in the space to be heated. Systems of this type are more particularly disclosed in the patent to Furlong, No. 2,164,511, and the patent to Landgraf and Furlong, No. 2,608,349. While systems as disclosed in these patents operate very successfully with substantial improvement over constant rate systems, they are still capable of further improvement to approximate the ideal control more closely. It is one of the objects of the present invention to provide such further improvements.

Another object is to provide a temperature control system in which the space heater is caused to operate at a low rate whenever the outside temperature is below a predetermined value independently of the temperature in the space.

According to a feature of the invention, the outside temperature is measured by a thermostat which closes a contact to start the space heater and also to energize a heater for the thermostat so that the space heater will cycle on and off to produce an average input approximately proportional to the outside temperature.

Another object is to provide a temperature control system in which the rate of operation of the space heater is varied inversely proportionately to the outside temperature. According to a feature of the invention, this is accomplished by a second outside thermostat which closes a contact when the outside temperature reaches a relatively low value to energize means for increasing the rate of operation of the space heater and also to energize a heater for the second thermostat so that it will alternately open and close the contact to provide a closed circuit time approximately inversely proportional to the outside temperature thereby to adjust the space heater for operation at a rate approximately inversely proportional to the outside temperature.

Figure 2:
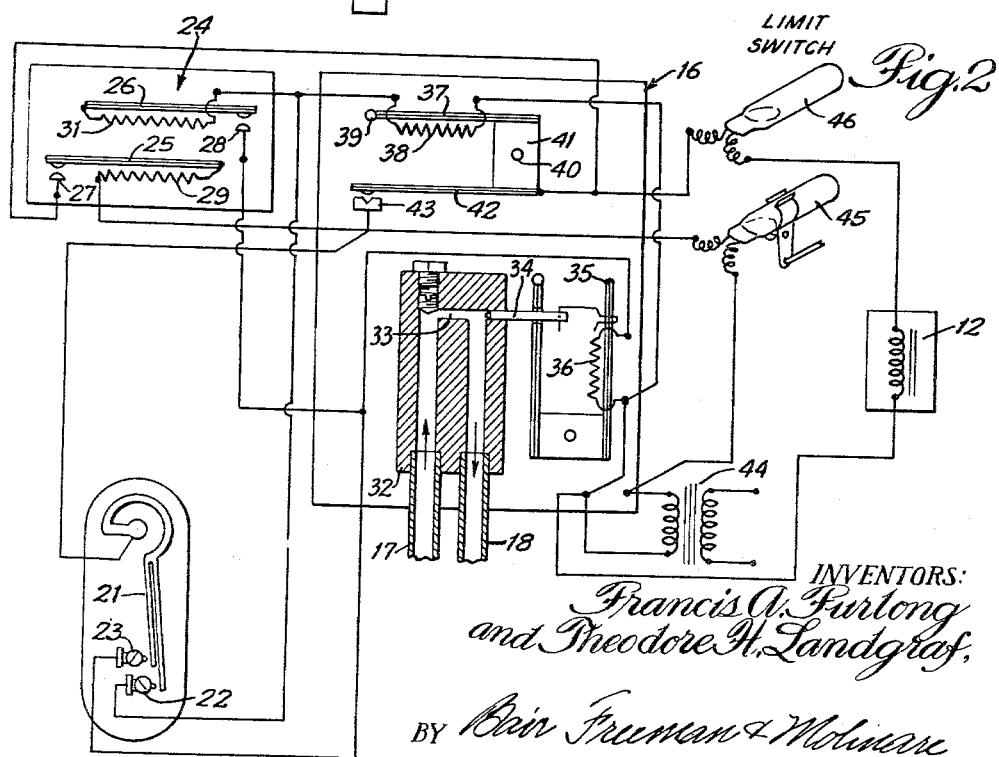

The above and other objects and features of the invention will be more readily apparent from the following description when read in connection with the accompanying drawing, in which:

FIGURE 1 is a diagrammatic view of a space heater control embodying the invention, and FIGURE 2 is a wiring diagram.

In the control system, as shown in FIGURE 1, the space heater is to be supplied with fluid fuel, such as gas, through a conduit 10 with the gas flowing from left to right, as indicated by the arrow. The right end of the conduit is connected to a burner in a furnace, or similar space heating device, to supply fuel thereto so that the device will heat the space whenever fuel is supplied to it at a rate proportional to the rate of fuel supply.

Supply of fuel to the burner through the conduit 10 is controlled primarily by a shut off valve 11 which is moved either to its fully open or fully closed position by an electric motor device 12. The motor device 12 may be a solenoid, an electric motor or gas actuated valve, as commonly used in the art. When the motor device 12 is energized, the valve 11 will open and when it is de-energized, the valve will close. The rate of supply of fuel to the burner and therefore the heat input rate may be varied by a valve device similar to that disclosed and claimed in our Patent No. 2,608,349. As shown in FIGURE 1, this valve device comprises a throttling valve 13 movable toward and away from a valve orifice by a diaphragm 14 to vary the rate of fuel flow. The space below diaphragm 14 is substantially enclosed either by a second diaphragm, as shown, or by a close fit around the stem of valve 13 and a spring 15 exerts a downward pressure on the upper surface of the diaphragm tending to open the valve 13.

The pressure beneath the enclosed lower surface of the diaphragm is varied by means of a control unit, indicated generally at 16, and which may take the same form as the corresponding control unit shown in our Patent No. 2,608,349. Gas under pressure from the inlet side of the valve 13 is conducted to the control unit through a pipe 17 and a pipe 18 connects the control unit to the space beneath the diaphragm, as shown. A restricted bleed passage 19 is provided connecting the space beneath the diaphragm to the conduit 10 downstream from the valve 13.

Operation of the system is thermostatically controlled by a room thermostat 21 having two blades engageable respectively with contacts 22 and 23. The thermostat is so constructed that the blade 22 will first close as the temperature falls and thereafter the blade 23 will close. In addition to the thermostat 21, a second thermostat unit, indicated generally at 24, is provided which is positioned outside of the space to add a control factor proportional to the outside temperature. As best seen in FIGURE 2, the unit 24 contains two thermostatic bimetal strips 25 and 26 with the thermostats being adjusted so that the strip 25 will close a circuit to a contact 27 at a predetermined outside temperature on the order of 60° F., while the thermostat 26 will close a circuit to a contact 28 at a lower outside temperature on the order of 50° F. In each instance, when the respective contact is closed a circuit will be completed through heaters 29 and 31 for the respective bimetal strips tending to heat them and cause them to reopen in cycles whose length will depend on the exact outside temperature. In the case of the thermostatic strip 25, its adjustment is preferably such that it will remain in contact regardless of its heater 29 when the outside temperature is at a very low value, on the order of 35° F. The control unit 16, as best seen in FIGURE 2, comprises a valve casing 32 with which the pipes 17 and 18 communicate and which includes a cross passage 33 interconnecting these pipes. This cross passage 33 may be variably restricted by a plunger 34 movable more or less into the cross passage and controlled by a bimetal blade 35. The blade 35 normally occupies the position shown, but may be heated by a resistance heater 36 to deflect to the left, as seen in FIGURE 2, to increase the restriction of the passage 33 evenly to the point where it is no greater than the vent passage 19 so that the pressure below the diaphragm 14 will be reduced to a minimum.

In addition, the control unit includes a heat-operated relay including a bimetal strip 37 heated by a resistance heater 38. The strip 37 is privotally fastened at one end 39 and is secured at its other end to a pivoted block 41 pivoted to a fixed pin 40 and which carries a compensating bimetal contact strip 42 adapted when the strip 37 is heated to engage a contact 43. Strips 37 and 42 are reversely positioned to compensate for ambient temperature.

The control system is powered from any suitable source of power, shown as a transformer 44, one side of those secondary is connected, through a safety pilot switch 45 which is normally closed when the pilot is burning, to the blade of the thermostat 21 and also to the contact 43 and to the heater 29 and blade 25 of the first outside thermostat. The contact 22 of the inside thermostate is connected to the heater 31 of the second outside thermostat and also to the heater 38 of the relay and in turn to the other side of the transformer secondary. Thus, when the thermostat blade 21 engages the contact 22, the heater 38 will be heated to cause the thermostatic strip 37 to deflect until its contact strip 42 engages the fixed contact 43. At this time, a circuit will be completed through a limit switch 46 placed, for example, in the bonnet of the furnace and normally closed through the motor means 12 to the other side of the transformer secondary. Under these conditions, the valve 11 will open to supply fuel to the burner.

At this time, however, the heater 36 is cold and the passage 33 is fully opened, as shown in FIGURE 2, so that maximum pressure is produced below the diaphram 14 to move the modulating or throttling valve 13 to its minimum open position. Therefore, a minimum quantity of fuel will be supplied to the burner and will operate at its minimum rate. This condition will continue as long as the thermostat blade 21 maintains contact with the contact 22. If the low heat input is sufficient to increase the temperature in the space to the desired value, the blade 21 will disengage the contact 22 and the burner will be shut off.

If the temperature within the space falls to a value such that the blade 21 will contact the contact 23, a circuit will be established from the contract 23 through the heater 36 to heat the bimetal strip 35 and move the valve member 34 to the left to restrict the passage 33. Restriction of the passage 33 will reduce the pressure beneath the diaphragm 14 so that the valve 13 may open to a greater degree to increase the rate of operation of the space heater. It will be seen that the increase in rate will depend upon the amount of time the thermostat blade remains in engagement with the contact 23 which in turn depends upon the amount the temperature within the space is below the desired valve or set point and the amount of time required to return the temperature in the space to the set point so that the temperature within the space will be returned as rapidly as is feasible to the set point. Thus as long as the temperature in the space is below the point at which contact 23 is closed the heater 36 will remain energized to increase the opening of valve 13.

In the event that the outside temperature falls to a point such that the thermostatic strip 25 engages the contact 27, a circuit will be established from one side of the transformer through the pilot switch 45, heater 29, blade 25 and contact 27 and through the limit switch 46 and motor unit 12 to the other side of the transformer. At this time, and independently of the inside temperature, as sensed by the thermostat 21, the fuel valve 11 will be opened to supply fuel to the space heater. However, because the heater 29 is energized it will heat the thermostat blade 25 and cause it to move away from the contact 27 after a time interval proportional to the amount the outside temperature is below the value at which the thermostat is set to close. Under these conditions, the space heater will operate through on-off cycles at low input which are so adjusted that the ratio of the "on" time to "off" time is approximately proportional to the amount the outside temperature is below the value for which the thermostat 25 is set. This heat input tends to anticipate cooling of the space and to maintain the space temperature at the desired valve before the inside temperature can drop to the point at which the thermostat 21 will close.

If the outside temperature is still lower sufficient to cause the thermostat blade 26 to engage the contact 28 and in the event the inside temperaure is low enough to cause the blade 21 to contact the contact 22, a circuit will be established from one side of the transformer through the pilot switch 45, blade 21, contact 22, heater 31, blade 26, contact 28 and heater 36 to the other side of the transformer. At this time and in spite of the fact that the blade 21 is not in engagement with the contact 23, the heater 36 will be energized to throttle flow through the passage 33 and to reduce the pressure beneath the diaphragm 14 so that the valve 13 will open to a greater degree. It will be noted that as long as there is a demand for heat in the space, as indicated by engagement of the blade 21 with the contact 22, the thermostat 26 will cycle, open and closed due to the effect of the heater 31 and will function to adjust the rate of heat input proportionately to the amount the outside temperature is below the point at which the thermostat 26 is set to close.

Thus, by the present invention the rate of heat input to the space to be heated is controlled jointly in response to both inside and outside temperature and the demand for heat input is anticipated when the outside temperature is below some preset valve. Therefore, the control system of the present invention tends to approach very closely the ideal control and to cause the space heater to operate at all times at a rate approximately proportional to the true demand.

While one embodiment of the invention has been shown and described herein, it will be understood that it is illustrative only and not to be taken as a definition of the scope of the invention, reference being had for this purpose to the appended claims.

What is claimed is:

1. A temperature control system for a space heater for supplying heat to a space, said control system comprising thermostatic means adapted to be responsive to the temperature in a space to be heated to start operation of a space heater when the temperature is below a predetermined value and to stop operation thereof when the temperature is above said value, and a second thermostatic means adapted to be responsive to the temperature outside of said space to start operation of the space heater when the outside temperature is below a predetermined point independently of the first named thermostatic means, heating means for the second thermostatic means effective when the second thermostatic means is operated to turn the space heater on to cause the space heater to operate in on-off cycles, and third thermostatic means adapted to be responsive to the outside temperature and operative when the outside temperature is below a lower predetermined point to increase the rate of operation of the space heater.

2. A temperature control system for a space heater for supplying heat to a space, said control system comprising thermostatic means adapted to be responsive to the temperature in a space to be heated to start operation of a space heater when the temperature is below a predetermined value and to stop operation thereof when the temperature is above said value, and a second thermostatic means adapted to be responsive to the temperature outside of said space to close a contact when the outside temperature is below a predetermined value, means responsive to closing of the contact to cause the space heater to operate, a heater for the second thermostatic means energized by closing of the contact to heat the second thermostatic means and cause it to open the contact, third thermostatic means adapted to be responsive to the outside temperature to close a contact when the outside temperature is below a lower predetermined value, means energized by closing of the last named contact to increase the rate of operation of the space heater, and a heater for the third thermostatic means energized by closing of the last named contact to heat the third thermostatic means and cause it to open the last named contact.

3. A temperature control system for a space heater for supplying heat to a space, said control system comprising thermostatic means adapted to be responsive to a temperature in a space including first and second contacts closed at different temperatures, means responsive to closing of the first contact to cause a space heater to operate, means responsive to closing of the second contact to increase the rate of operation of the space heater, second thermostatic means adapted to be responsive to the temperature outside of the space to cause the space heater to operate when the outside temperature is below a predetermined value, and third thermostatic means adapted to be responsive to the outside temperature to energize said means for increasing the rate of operation of the space heater when the outside temperature is below a lower predetermined value.

4. A temperature control system for a space heater for supplying heat to a space, said control system comprising thermostatic means adapted to be responsive to a temperature in a space including first and second contacts closed at different temperatures, means responsive to closing of the first contact to cause a space heater to operate, means responsive to closing of the second contact to increase the rate of operation of the space heater, second thermostatic means adapted to be responsive to the temperature outside of the space to close a contact when the outside temperature is below a predetermined value, means responsive to closing of the last named contact to cause the space heater to operate, a heater for the second thermostatic means energized by closing of the last named contact, third thermostatic means adapted to be responsive to the outside temperature to close a contact when the outside temperature is below a lower predetermined value, closing of the last named contact energizing said means to increase the rate of operation of the space heater, and heating means for the third thermostatic means energized by closing of the last named contact.

References Cited by the Examiner
UNITED STATES PATENTS

| | | | |
|---|---|---|---|
| 1,794,530 | 3/31 | Newell | 236—91 |
| 1,961,252 | 6/34 | Shivers | 236—91 XR |
| 2,159,342 | 5/39 | Persons. | |
| 2,164,511 | 7/39 | Furlong | 236—1 |
| 2,168,178 | 8/39 | Thompson | 236—68 XR |
| 2,303,894 | 12/42 | Olsen | 236—9 XR |
| 2,329,473 | 9/43 | Landon | 236—9 |
| 2,369,739 | 2/45 | Johnson et al. | 236—68 |
| 2,507,130 | 5/50 | Williams | 236—68 |
| 2,526,972 | 10/50 | Ray | 137—80 |
| 2,767,923 | 10/56 | Matthews | 236—9 |

EDWARD J. MICHAEL, *Primary Examiner.*

ALDEN D. STEWART, *Examiner.*